Oct. 5, 1954

C. W. GEER 2,691,162

RADAR EQUIPMENT

Filed Oct. 27, 1949

INVENTOR.
CHARLES WILLARD GEER

BY HIS ATTORNEYS.
HARRIS, KIECH, FOSTER & HARRIS

Oct. 5, 1954     C. W. GEER     2,691,162
RADAR EQUIPMENT
Filed Oct. 27, 1949     2 Sheets-Sheet 2
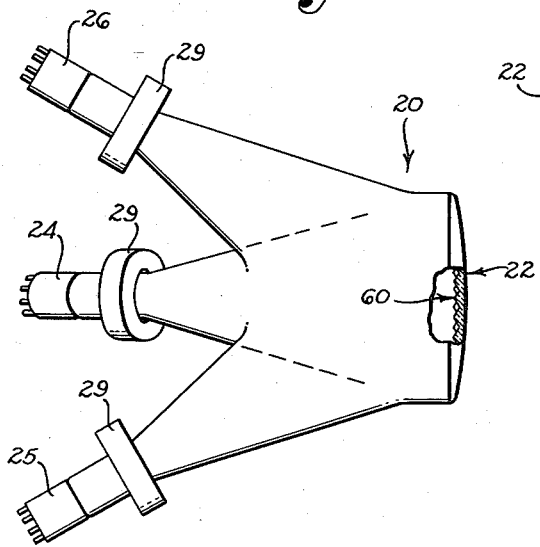
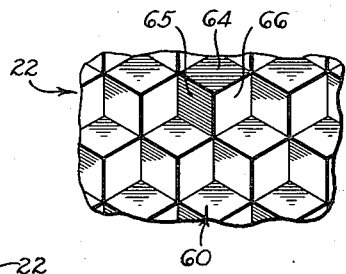
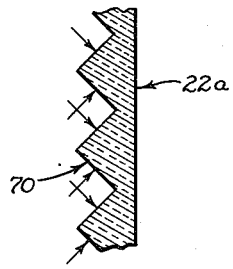
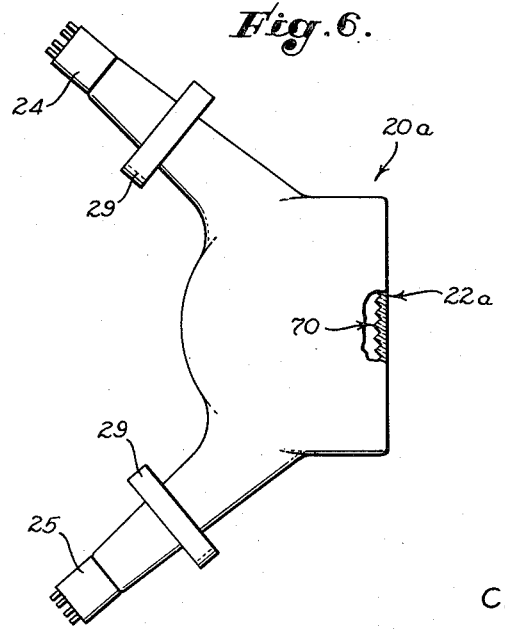
INVENTOR.
CHARLES WILLARD GEER
BY HIS ATTORNEYS.
HARRIS, KIECH, FOSTER & HARRIS Patented Oct. 5, 1954

2,691,162

UNITED STATES PATENT OFFICE 2,691,162

RADAR EQUIPMENT

Charles Willard Geer, Long Beach, Calif.

Application October 27, 1949, Serial No. 123,941

10 Claims. (Cl. 343—6.5)

This invention relates in general to radar equipment, and, more particularly, to such equipment which is adapted to receive and present in distinguishable manner signals from identified and unidentified targets such, for example, as friendly and enemy aircraft or ships.

Radar equipments of the type to which this invention is particularly directed are electronic devices in which a pulsed radio-frequency energy radial sweep is rotated to produce a plan view of an area on the screen of a cathode ray tube. All objects within the range of transmission will reflect or echo a portion of the energy and intensity-modulate the cathode ray tube so as to produce a bright spot, more commonly known as an echo or "pip," on the screen of the cathode ray tube. Presentation systems of this type are commonly known as "Plan Position Indicators" or "PPI." A limitation in such equipment, however, lies in the fact that it will not distinguish between friendly and enemy targets, with the result that in war maneuvers, it is frequently impossible to ascertain whether a detected aircraft or ship belongs to friendly or enemy forces. As a consequence, many pitiful losses particularly of friendly planes have occurred in such maneuvers. To obviate this difficulty electronic devices have been employed on friendly planes and ships which transmit identification signals, such being known as "Identification Friend or Foe" signals, or more commonly as IFF signals. Such devices are commonly "triggered" by the radar pulses and transmit signals, differing in frequency from the radar pulses, to a separate receiver operated in conjunction with the radar equipment. With such arrangement, it is desirable that any identified radar signals, those accompanied by IFF signals, be presented on the same indicator and be readily distinguishable by the operator of the equipment. In accordance with the present invention, these results are achieved.

It is an object of this invention to employ in radar equipment of the indicated character a television type of color screen (such as disclosed in my Patent No. 2,480,848) in place of the present monocolor radar screen and to use in a known electronic system a separator which will analyze and separate identified target signals such as friendly IFF signals and unidentified target signals and transmit them to the color screen so as to present the different signals in different and readily distinguishable colors, for example, the identified signals or friendly IFF signals are applied selectively to an electron gun of the radar tube which will be disposed with respect to the color screen to yield a green color, whereas unidentified signals or those unaccompanied by IFF signals will be separated and selectively passed to an electron gun disposed to yield a red color. Where the IFF signal does not correspond with the code of the day but with other code conditions, such as the code of the day before, the separator may be made to transmit the signal to a third electron gun so disposed as to produce a blue or yellow or other selected color upon the color screen.

A further object of this invention is to provide a radar type of structure of the indicated nature employing a color screen which shall be rugged, resistant to injury by vibration, and positively effective for accurately distinguishing between friendly and unfriendly planes, and further distinguishing with respect to a plane which is probably or possibly friendly but fails to possess the code of the day.

Other objects, together with the various features of construction, of this invention will appear to those skilled in the art upon reference to the following specification and accompanying drawings wherein certain embodiments of the invention are more or less diagrammatically shown by way of illustration.

In the drawings:

Fig. 4 is principally a side elevation of a radar tube provided with three electron guns representative of three colors, the relationship of the color screen being illustrated by breaking away a portion of the tube;

Fig. 5 is a fragmentary face elevation showing a pyramidal construction of the face of the color screen for three-color use;

Fig. 6 is a modification of the tube of Fig. 4 and indicating a construction for a two-color tube; and Fig. 7 is a diagrammatic showing of the impingement relationship on the color screen between beams from different electron guns.

Figure 1:
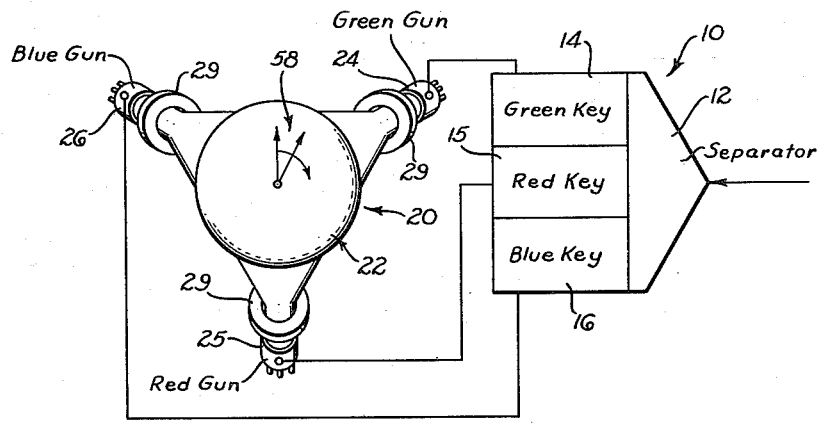
Fig. 1 is a diagrammatic view indicating the relationship of a radar receiver including an appropriate analyzing separator cooperating with a radar tube having a color screen and employing electron guns for yielding three colors.

The system as a whole is diagrammatically illustrated in Fig. 1. Here a receiver generally indicated at 10 comprises a known type of separator 12 into which the object echoes with or without IFF signals are delivered. This known type of separator is used with and includes known means for analysis of composite signals whereby to provide for passing the radial sweep reflected signals to appropriate electron guns, in accordance with this invention, to produce color spots on the screen of a cathode ray tube, according to this invention, and to correspond with the composite signals received. Reflected signals so passed or separated are directed respectively to keys for the green, red, and blue guns of the tube, these keys being respectively indicated at 14, 15, and 16. In its simpler form the separator 12 may consist merely of frequency selective circuits or even two or more receivers tuned to different frequencies. Thus, as is well known, it has been customary to operate radar equipments on one frequency and the transmitting portion of an IFF equipment on a considerably different frequency. In order to separate received signals, it is merely necessary to employ devices responsive to differing frequencies. By way of example, IFF signals of one frequency are applied to the green key 14 and all radar signals are applied to the red key 15. As will hereinafter be explained, application of a signal to the green key will cause a signal to be applied to the grid of the green gun with the result that a green signal will be presented on the indicator tube 22 denoting an identified signal. In like manner, radar echoes will be applied to the red key which in turn will apply a signal to the grid of the red gun causing the appearance of a red signal on the indicator. Thus, in its simplest form, the invention provides readily distinguishable signals on the face of the cathode ray tube. Unidentified circuits will present a simple red indicator, whereas identified targets will present a combined red and green indication. The additive effect of the red and green will produce a color indication readily distinguishable from the red alone. Such operation incorporates but two colors and the tube shown in Fig. 7 is satisfactory therefor. In the event it is desired to distinguish between IFF responses, for example, those corresponding with the code of the day and those corresponding with some other code, an additional blue key can be employed in connection with a tricolor tube as shown in Fig. 1. In this arrangement, the separator circuit again separates, by frequency selection, the radar echoes and applies them to the red key. If the IFF signals themselves differ in frequency, a similar arrangement is provided to separate them and to apply the proper signals to the green and blue keys. If, on the other hand, the IFF signals are of like frequency, but are coded, for example, by employing different pulse lengths or the like, these may be separated in well known ways by the employment of integrating and differentiating circuits. The radar (cathode ray) tube is indicated generally at 20 and includes a color screen 22, a green electron gun 24, a red electron gun 25, and a blue electron gun 26, disposed with respect to the color screen 22 to effect the appropriate color production, as hereinafter more fully described. Magnetic deflecting yokes 29 are provided on the necks of the respective guns 24, 25, and 26, as well understood in the art.

Figure 3:
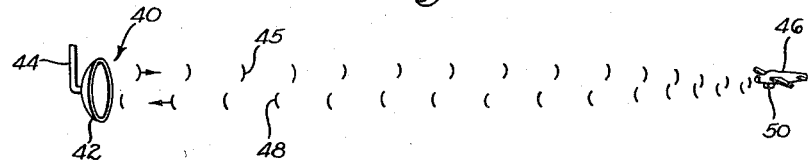
Fig. 3 is a diagrammatic representation of the transmission of radar pulses from the sending or observing plane and its reception of the IFF echoes from an observed plane.

In Fig. 3 the transmitter of the observing airplane is generally indicated at 40 and includes the usual receiving antenna that may be of the parabolic reflector or "dishpan" type as designated at 42 and a conventional rotary radar antenna diagrammatically indicated at 44. Here the transmitted waves are indicated as progressing outward in a series 45 to the plane 46 which is being observed. The echo is indicated as returning in an advancing series 48, and this echo will carry the required code signal from a friendly plane having an IFF device 50 operating with the code of the day, or any other code signal from a plane having an IFF device. The pulse wave transmitted by the observing plane may serve to trigger or initiate the IFF signal on the observed plane.

Figure 2:
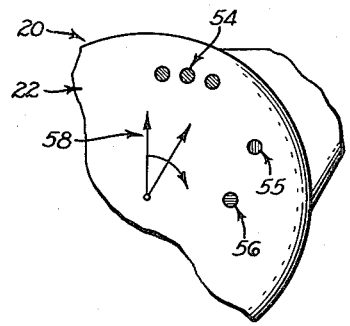
Fig. 2 is a fragmentary indication on an enlarged scale of a portion of such radar color screen to indicate how spots of different colors will appear on the screen as representative of friendly, unfriendly, and uncertain planes.

The results of operation are generally indicated in Fig. 2. Thus, where all of a series of planes 46 being checked are provided with the proper IFF code, such series of planes will at any given interval be indicated by a corresponding series of colored spots 54, these being created by the functioning of the analyzing separator 12 and the key 14 for the green gun 24, together with key 15 for the red gun 25. Should the plane being checked fail to return a code or an unofficial code, the analyzing separator 12 will transmit the corresponding signal to the key 15 which will appropriately pass the corresponding modified signal to the red gun 25 and thereby cause to be produced on the color screen 22 a red spot 55. Should a plane 46 have an IFF device working with a code which has recently been official, the analyzing separator will conduct the signal to the key 16 for the blue gun which will pass a modified signal to the blue gun 26 whereby to produce on the screen 22 a distinguishably colored spot 56.

The green, red, and blue guns 24, 25, and 26 sweep the color screen 22 in any desired manner, such as radially in a conventional PPI system or horizontally as preferred. As diagrammatically indicated in Figs. 1 and 2 at 58, the successive positions may designate successive radial sweeps as the receiving antenna progresses in rotational scan. Since these beam sweeps occur at rates approximating one second, so that there is an appreciable time lag between sweeps, it is necessary that the phosphors used on the color screen 22 be phosphorescent phosphors in order that the light spots will endure upon the screen face almost until the sweep is repeated, that is during most of the interval between sweeps. Such phosphorescent phosphors which will yield different colors, such as green, red, and blue or yellow or the like, are well known in the electronics industries. As a consequence, successive sweeps of the beams from the respective guns at appropriate intervals, such as the mentioned one-second intervals, result in the showing of the variously colored spots, such as represented in Fig. 2, progressively as the observing plane and the observed plane or planes advance. These colors aid correct perception by the observer and insure accurate ascertainment of which planes are friendly (green spots 54), which planes are unfriendly (red spot 55), and which planes, if any, are uncertain and require investigation because of possibly having used an outdated code (blue spot 56).

The physical construction of the radar tube 20 and its color screen 22 is disclosed in Figs. 4 and 5, and in general in my Patent No. 2,480,848 above mentioned. Here the screen is provided with a plurality of trihedral pyramids 60, each of which has three faces 64, 65, and 66 arranged to be respectively impinged by beams from the electron guns 24, 25, and 26. These faces are respectively coated with phosphorescent phosphors which, when energized by the respective beams from the respective keys 14, 15, and 16 and their guns, will produce green, red, and blue effects which will adequately endure between beam sweeps, as above outlined. Thus, as the sweeps progress, the positions of the respective green, red, and blue spots 54, 55, and 56 respectively progress on the screen 22 in accordance with the relative movements of the observing plane and the observed planes. Since the coated pyramidal faces 64, 65, and 66 project upward from the general plane of the color screen 22, and since the guns 24, 25, and 26 are angularly arranged with respect thereto so that the respective beams impinge substantially only upon the indicated respective faces, the respective beams will yield on the screen 22 only the respective colors. The light effects produced by the phosphors under energization of the beams will die out as the interval for each sweep expires, whereby the corresponding light spots produced on the next sweep will appear in accordance with any relative change in positions of the observed and observing planes.

In Fig. 6 there is indicated a slightly modified form of tube 20a with a color screen 22a wherein only the two green and red electron guns 24 and 25 are employed, and only two opposing faces are provided in each elevation 70 of the color screen. These elevations 70 are in the form of elongated ridges. In Fig. 7 relative impingement of beams upon opposite faces of the ridges 70 is indicated by arrows, and the same general relationship exists where the pyramids 60 having three faces, indicated in Fig. 5, operate in conjunction with the three guns of Figs. 1 and 4.

The color screen in each form is transparent or translucent and is conveniently viewed from the outside. These screens may be either slightly curved, as in Fig. 4, or flat, as in Fig. 6, or of other appropriate configuration as may be found necessary or desirable.

Since variations of the generic invention disclosed will be apparent to those skilled in the art, it is intended to cover all forms thereof which fall within the scope of the patent claims.

I claim as my invention:

1. In combination in electronic equipment including means for providing a radio-frequency signal capable of reflection by an object to produce an echo signal and capable of actuating a transmitter to produce an identification signal: an indicator tube equipped with a screen having a multiplicity of elevations, each elevation providing separate angularly arranged faces respectively provided with phosphors yielding different colors upon energization; a plurality of electron guns respectively directed toward the respective faces; and a receiving apparatus including means for separating echo and identification signals and selectively transmitting said signals to the respective electron guns.

2. In combination: a radar wave transmitting means adapted to actuate a receiver-transmitter to produce an independently transmitted identification signal; an indicator tube equipped with a screen having a multiplicity of elevations, each elevation providing separate angularly arranged faces respectively provided with phosphors yielding different colors upon energization; electron guns respectively directed toward the respective faces, and signal receiving apparatus including means for separating object echo signals comprising reflections of the output energy of said transmitting means and said independently transmitted identification signal, and analyzing means for selectively transmitting analyzed signals to the respective electron guns.

3. A combination as in claim 1 wherein corresponding faces of said elevations are provided with phosphorescent phosphors.

4. In combination in radar equipment including means for providing a signal, said signal being capable of reflection to provide an echo and actuating a transmitter to produce an identification signal: an indicator tube equipped with a screen provided with means for producing a plurality of colors upon respective energizations, said screen being capable of presenting a visual representation; a corresponding plurality of electron guns for respectively energizing said color means; and separator means for receiving said echo and identification signal and separating the latter, said separator means including signal analyzing means for keying said respective signals to the different electron guns and connected respectively with the guns for production selectively of said colors.

5. In combination: a radar transmitter providing output energy for actuation of a receiver-transmitter to produce an independently transmitted signal; an indicator tube provided with a screen for visual presentation provided with means for producing a plurality of colors upon respective energizations; a corresponding plurality of electron guns for respectively energizing said color means; and separator means for receiving incoming echo signals comprising reflections of the output energy of said transmitting means and said independently transmitted identification signal and separating the latter, such separator means including signal analyzing means and means for keying analyzed signals to the different electron guns and connected respectively with the guns for production selectively of said colors.

6. In a radar receiver and presentation unit of the type adapted to receive, distinguish between, and separately present a representation of identified and unidentified targets, said representation of said targets being produced by signals emanating therefrom: a cathode ray tube including a screen comprising a multiplicity of projecting elements, the individual faces of which are coated with phosphors of different color characteristic and the geometrically corresponding faces of all said projecting elements being coated with phosphors of like color characteristic; electron guns angularly disposed with respect to the said faces whereby the electron beam from each said gun energizes only phosphors of like color characteristic; and means for controlling one of said electron guns by signals emanating from said identified target and additional means for controlling another of said electron guns by signals emanating from said unidentified target whereby identified targets are presented in one color and unidentified targets are presented in a different color.

7. In a radar receiver and presentation unit of the type adapted to receive, distinguish between and separately present a representation of identified and unidentified targets, said representation of said targets being produced by signals, said signals constituting energy reflected by said targets and energy originating from at least one of said targets, the combination of: an indicator tube provided with a means for producing a plurality of colors upon respective energizations; a corresponding plurality of electron guns for respectively energizing said color means; and means for controlling one of said electron guns by signals emanating from said identified target and additional means for controlling another of said electron guns by signals emanating from said unidentified target whereby identified targets are presented in one color and unidentified targets are presented in a different color.

8. In combination in electronic equipment: a first transmitter for providing a transmitted signal capable of reflection by an object to produce an object echo signal; a second transmitter associated with said object adapted to be triggered by said transmitted signal for producing an identification signal; a receiver for receiving said object echo signal and said identification signal; an indicator tube equipped with a screen provided with means for producing a plurality of colors upon respective energizations; a corresponding plurality of electron guns for respectively energizing said color means, said guns being connected to said receiver; and separating and analyzing means included in said receiver for separating said object echo signal and said identification signal for selectively communicating analyzed signals to the respective electron guns.

9. In electronic equipment including a transmitter for providing a transmitted signal capable of reflection to produce an echo signal, the transmitted signal being adapted to trigger an identification transmitter for producing an identification signal, the combination of: an indicator tube equipped with a screen having a multiplicity of elevations, each elevation providing separate angularly arranged faces respectively provided with phosphors yielding different colors upon energization; a plurality of electron guns respectively directed toward the respective faces; a receiver connected to said electron guns for receiving said echo signal and said identification signal including means for separating said last-mentioned signals; and analyzing means for selectively transmitting analyzed signals to the respective electron guns.

10. In electronic equipment including a transmitter for providing a transmitted signal capable of reflection to produce an echo signal, the transmitted signal being adapted to trigger an identification transmitter for producing an identification signal, the combination of: an indicator tube equipped with a screen having a multiplicity of elevations, each elevation providing separate angularly arranged faces respectively provided with phosphors yielding different colors upon energization; a plurality of electron guns respectively directed toward the respective faces; and a receiver connected to said electron guns for receiving said echo signal and said identification signal including analyzing and separating means for separating said last-mentioned signals for transmitting the same selectively to the respective electron guns.

References Cited in the file of this patent

UNITED STATES PATENTS

| Number | Name | Date |
| --- | --- | --- |
| 2,403,227 | Leverenz | July 2, 1946 |
| 2,408,415 | Donaldson | Oct. 1, 1946 |
| 2,440,301 | Sharpe | Apr. 27, 1948 |
| 2,446,248 | Shrader | Aug. 3, 1948 |
| 2,480,848 | Geer | Sept. 6, 1949 |
| 2,515,178 | Barchok | July 18, 1950 |
| 2,530,828 | Leverenz | Nov. 21, 1950 |
| 2,537,102 | Stokes | Jan. 9, 1951 |